(12) United States Patent
Wacker et al.

(10) Patent No.: US 11,175,640 B2
(45) Date of Patent: Nov. 16, 2021

(54) CONTROL SUBSYSTEM HAVING AN INTEGRATION FRAMEWORK

(71) Applicant: Honeywell International Inc., Morris Plains, NJ (US)

(72) Inventors: Paul Wacker, Plymouth, MN (US); Michael A. Pouchak, St. Anthony, MN (US); Ravi Bharathi Krishnan, Bangalore, IN (US)

(73) Assignee: Honeywell International Inc., Charlotte, NC (US)

( * ) Notice: Subject to any disclaimer, the term of this patent is extended or adjusted under 35 U.S.C. 154(b) by 157 days.

(21) Appl. No.: 16/436,870

(22) Filed: Jun. 10, 2019

(65) Prior Publication Data

US 2020/0387123 A1  Dec. 10, 2020

Related U.S. Application Data

(60) Provisional application No. 62/859,583, filed on Jun. 10, 2019.

(51) Int. Cl.
| | |
|---|---|
| G05B 19/418 | (2006.01) |
| G06F 9/44 | (2018.01) |
| G05B 11/01 | (2006.01) |
| G05B 19/042 | (2006.01) |
| G05B 19/42 | (2006.01) |
| G05B 15/02 | (2006.01) |
| H04L 29/08 | (2006.01) |
| G06F 21/60 | (2013.01) |

(Continued)

(52) U.S. Cl.
CPC ........... *G05B 15/02* (2013.01); *G06F 21/602* (2013.01); *G06F 21/606* (2013.01); *H04L 67/025* (2013.01); *H04L 67/1097* (2013.01); *H04L 67/125* (2013.01); *F24F 11/63* (2018.01); *G06F 8/65* (2013.01)

(58) Field of Classification Search
CPC .... G06F 11/2273; G06F 3/0486; G06F 16/40; G06F 8/24; G06F 8/34; G06F 21/602; G06F 21/606; Y02P 90/02; F23N 2223/38; H04L 67/1097; H04L 67/025; H04L 67/125; G05B 19/0426; G05B 19/056; G05B 13/028; G05B 19/4183; G05B 19/4184; G05B 19/41845; G05B 19/02
See application file for complete search history.

(56) References Cited

U.S. PATENT DOCUMENTS 6,813,525 B2  11/2004  Reid et al.
8,418,128 B2  4/2013  Pouchak et al.
(Continued)

OTHER PUBLICATIONS

Inayama et al., Toward an Efficient User Interface for Block-Based Visual Programming, 2 pages (Year: 2018).*

(Continued)

*Primary Examiner* — Thuy Dao
(74) *Attorney, Agent, or Firm* — Seager, Tufte & Wickhem LLP

(57) ABSTRACT

A pseudo determinism control subsystem for event-driven integration framework of a controller system with application relative to various parameters such as, for instance, energy consumption. Pseudo determinism, near real time and/or direct digital control combined with event driven control along with strong security and high speed throughout the controller system.

17 Claims, 6 Drawing Sheets

(51) Int. Cl.
*F24F 11/63* (2018.01)
*G06F 8/65* (2018.01)

(56) References Cited

U.S. PATENT DOCUMENTS

| | | | |
|---|---|---|---|
| 8,532,797 B2 | 9/2013 | Gutha et al. | |
| 8,549,422 B2 | 10/2013 | Gutha et al. | |
| 8,640,120 B2 | 1/2014 | Gutha et al. | |
| 8,650,306 B2 | 2/2014 | Pouchak | |
| 8,738,793 B2 | 5/2014 | Gutha et al. | |
| 8,793,668 B2 | 7/2014 | Gutha et al. | |
| 8,842,653 B1 | 9/2014 | Rao et al. | |
| 9,322,566 B2 | 4/2016 | Wenzel et al. | |
| 9,417,637 B2 | 8/2016 | Matsuoka et al. | |
| 9,606,520 B2 | 3/2017 | Noboa et al. | |
| 9,618,925 B2* | 4/2017 | Eldridge | G06F 8/34 |
| 9,798,336 B2 | 10/2017 | Przybylski | |
| 2003/0153988 A1 | 8/2003 | Shepard et al. | |
| 2009/0113037 A1 | 4/2009 | Pouchak | |
| 2011/0029102 A1* | 2/2011 | Campney | G05B 17/02 700/83 |
| 2011/0160878 A1 | 6/2011 | Gutha et al. | |
| 2011/0160879 A1 | 6/2011 | Gutha et al. | |
| 2016/0020910 A1 | 1/2016 | Jones et al. | |
| 2016/0091204 A1* | 3/2016 | Patton | F23N 5/203 700/274 |
| 2019/0034309 A1 | 1/2019 | Nayak et al. | |

OTHER PUBLICATIONS

"CIPer TM Model 10 Controller (/CIPer-Controllers/CIPer%E2%84%A2-Model-10-Controller)," Honeywell, 3 pages, 2019.
"CIPer TM Model 30 HVAC Controller: Scalable, Fast and Flexible," Honeywell, 2 pages, May 2019.
"CIPer Controllers With Niagara 4 Framework," Honeywell, 3 pages, 2019.
"DVC-V304," Delta Controls, 3 pages, 2019.
"Technical Document: Niagara AX-3.X Browser Access Guide," Niagra Framework, 84 pages, May 30, 2007.
"Spyder: PUL-, PVL-, PUB-, PVB-Controllers," Honeywell, 422 pages, Mar. 2015.

* cited by examiner

CONTROL SUBSYSTEM HAVING AN INTEGRATION FRAMEWORK

This application claims the benefit of U.S. Provisional Patent Application Ser. No. 62/859,583, filed Jun. 10, 2019. U.S. Provisional Patent Application Ser. No. 62/859,583, filed Jun. 10, 2019, is hereby incorporated by reference.

BACKGROUND

The present disclosure pertains to controllers, and particularly to improved features of controllers.

SUMMARY

This disclosure reveals pseudo determinism control subsystem for event-driven integration framework of a controller system with application relative to various parameters such as, for instance, energy consumption. Pseudo determinism, near real time and/or direct digital control combined with event driven control along with strong security and high speed throughout the controller system.

DESCRIPTION

Figure 1:
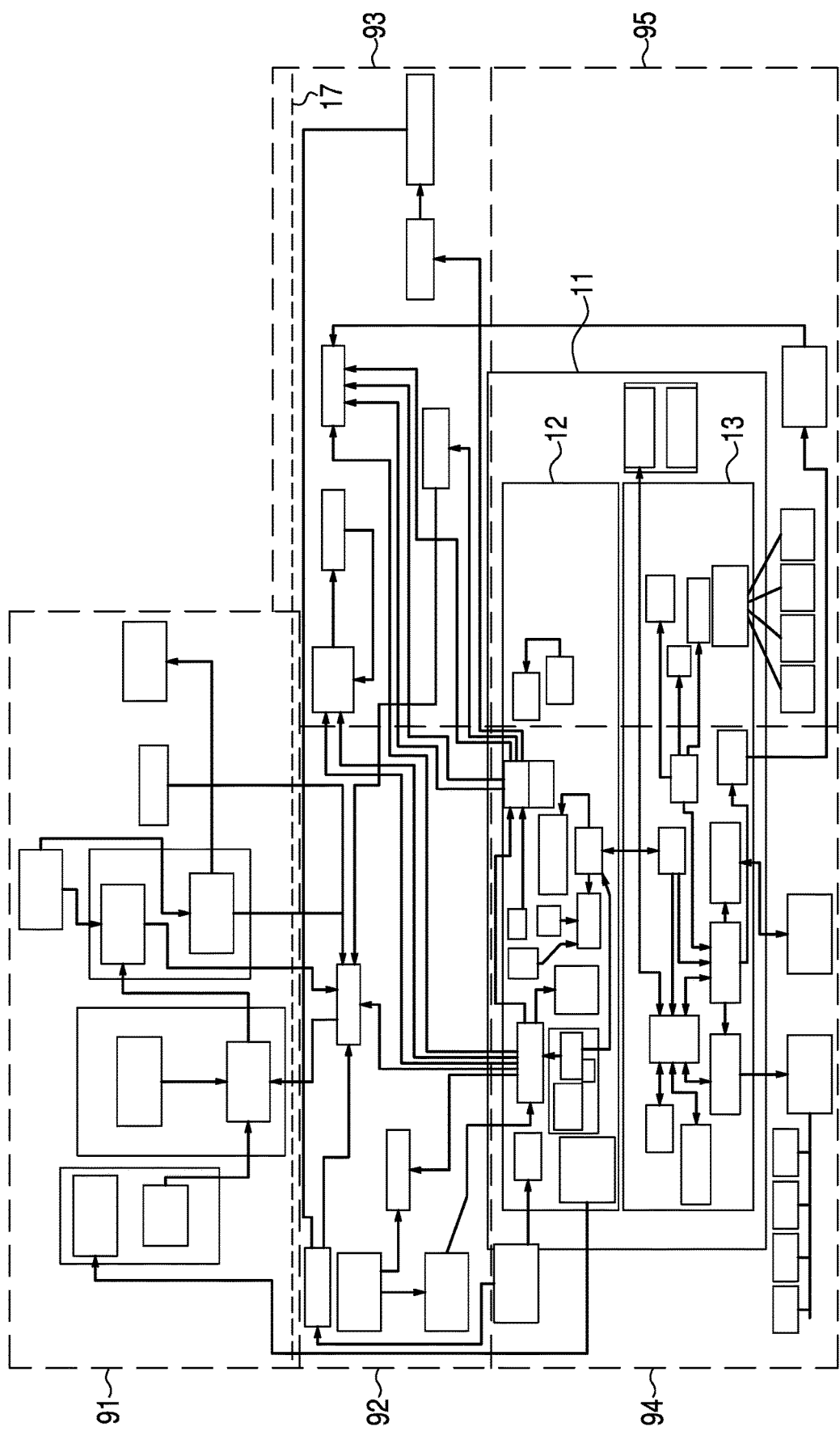
FIG. 1 is a diagram of the present system and approach.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

A powerful direct digital control (DDC) and integration control platform that is scalable and easy to use and meet building owners and contractors' seems to be needed for a highly secure and robust technical solution. One may combine heating, ventilation and heating (HVAC) DDC control with the embedded workstation platform, and DDC controllers with embedded workstation platform software design. An embedded workstation platform event-driven approach (such as a Windows operating system (OS) or Unix OS environment) is not necessarily easily suited to real-time common in HVAC DDC control. The present system may solve an issue of combining high-power event needs for HVAC DDC Controls.

There may be a benefit for determinism in feedback control applications that will ensure timeliness and consistency feedback control loops (using approaches such as PID) that are tuned for the desired system response, and oscillatory behavior of the system; however, this may in turn lead to degraded comfort, wasted energy, and the like.

A Niagara™ framework may be highly flexible and powerful environment for intelligent building integration, and management systems. As such, it may use JAVA™ with an event-based execution model.

Depending on how the blocks are connected, in an order of random input event occurrence, there are necessarily no consecutive execution iterations of the blocks. While efficient for supervisory services, this issue may have been noted previously when used for feedback control logic.

Approaches may be introduced within the Niagara framework to allow for a subset of logic that is executed and associated with non-determinism may be handled, along with monitoring of the determinism quality, and properties and attain the desired performance. This may include a container with an approach to launch a subset of control logic blocks that may be executed in a defined manner of the performance.

An architecture diagram may be referred to in FIG. 1. Implementation details may incorporate the following items. 1) Function block executions may be sequenced; 2) Users may change the block sequence and control the order of execution; 3) Execution engine priority may be adjusted to ensure that the engine gets higher priority; 4) Engine logic may mark the starting millisecond in a second when the engine starts and executions begin (for example, if the engine starts at 20 ms of a second, next iteration may also be started at 0020, 1020, 2020, 3020, . . . N020 seconds); 5) Mechanisms may be put in place to detect deviations in the execution; 6) Mechanisms may be put in place to trend the execution time cycle for rectification in case of a deviation; and 7) Options may be available for the users to report out any misses in the execution cycle or anything else.

There may be a rapid control system prototyping solution with real time feedback. Buildings may consume a vast amount of the total energy consumed in the U.S. A significant portion of the energy consumed in buildings may be wasted because of the lack of controls or the inability to use existing building automation systems (BAS's) properly. Much of the waste may occur because of an inability to manage and control buildings efficiently. Many of these buildings currently do not use BAS's to monitor and control their energy systems from a central location. Buildings that use BAS's are typically large (>100,000 sf).

In general, the application of and control of custom DDC application programs depend on easy to use programming languages and reuse of libraries. In the past, frameworks such as Niagara combined with application programming environments have been successful due to the integration between the "function block" or block input/output graphical programming language and the application of controls in a real-time embedded controller. In the past, it appears to have been disruptive and time consuming to complete virtually all the processes of design from the start of the control strategy, to implementation, and to downloading. Often in advanced applications, there may be a large amount of iteration, and the cycle time of the iteration may be critical to success. It appears essential to solve the issue of a fast and reliable design using web architecture combined with quick downloads and quick feedback for the actual results of a control strategy.

The present system appears different from the related art due to a unique and efficient use of the compiled graphical programming image and its implementation in the event-driven Niagara framework. Past implementations of a web function block language were limited to a downloaded image that was first compiled graphically, and converted to an efficient storage mechanism that required sophisticated storage file sections in real-time file structures A complicated and non-volatile storage mechanism in the real time DDC controller needed a sophisticated segmentation of data and object information including a function block configuration, parameters, a Sylk™ configuration, network variables, BACnet and a Lon™ interface configuration, and other control network information parameters. The present approach appears significantly faster, and allows near instantaneous feedback of results. In addition, techniques have been implemented to take advantage of the internet protocol (IP) network and allow powerful integration with a Niagara workbench.

The present system may be a result of segmenting the Niagara wire sheet in a system on module (Som) board and allowing all the configuration and actual implementation of the running real-time function block engine in the Som board under Niagara to communicate to the baseboard with some architectural extensions for high speed communications as noted in the following: 1) Configuration of the function blocks are maintained in the Niagara environment in XML and run directly on a Niagara event driven environment; 2) The Niagara event driven environment may have special modifications made that allow the function block engine and overall DDC performance to be maintained in a pseudo deterministic environment, allowing the power of the Niagara event-driven engine to be combined with a highly deterministic function block engine DDC dedicated controller with analog/digital (A/D) and IO performance; 3) The baseboard subsystem may be implemented in a highly efficient protocol that allows direct access to local subsystems such as Sylk, DO/AO/AI physical IO assignments and extension IO subsystems; 4) The baseboard subsystem may be implemented with a unique error message passing mechanism to help identify subsystem configuration issues without using slower configuration error data structures; 5). The baseboard subsystem may be implemented using a high speed serial port communicating to extremely low latency RAM/flash configuration approach that reduces many of the delays, file download times, and overhead; 6) Overall performance for configuration may be nearly instantaneous to the user, allowing near real time performance and no disruption to the design and trouble-shooting process; and 7) The normally separate action of enabling debugging may be eliminated due to the actual performance and IO feedback being given in the pseudo real-time Niagara wire sheet.

A sensor in the present system may be hardware device with some embedded software measuring/detecting & transmitting data (e.g., temperature, pressure, motion) software type. As embedded, software runs in a device/unit (firmware). Software may be incidental to the present controller, which may be deployed using software, or manually (without the software).

A present controller (CIPer™ 30) may combine benefits of a high speed commercial information technology (IT) infrastructure, friendly IP networks with the robust and highly autonomous individual zone control (e.g., Spyder™ controller) with the great power and advantages of a Niagara™ integration platform. Cybersecurity may be built in from the ground floor and support scalable and high level security, including secure socket layer (SSL) encrypted communications and Fox security (FOXs) protocol between controllers. The current standard in building automation for BACnet™ IP and Lonworks™ does not necessarily appear to support this level of security.

A JACE™ is a mechanism or device that may provide connectivity to systems (e.g., HVAC, electrical, even security in some cases) within a building via the Niagara framework. By connecting common network protocols such as LonWorks, BACnet, and Modbus, along with many other networks, a unified system without seams may result.

The present system may be a collection of subsystems that are composed of key components. There may be an overall system performance that is easy to use, and represents a significant increase in performance and power over the related art. Some of the individual components that contribute to the system may include: a high speed built in 4-port switch with 1 Gbps performance; an overall system cost being ¼ of a cost of a combination controller and supervisor, separately; an open protocol Niagara N4 wire sheet; alarming, history, schedules, web server, and tagging; a built in IO of 3 UI/AI, 3 UI/AO, 6 DO with expansion modules modular enhancement up to 300 points total; an industry standard Niagara framework for reduced training; standard integration drivers, and open system solutions; built in analytics for preventative maintenance and predictive failure analysis; built in SSL encrypted communication and Federal information processing standard (FIPS) 140-2 level 1 compliance; easy communication between CIPer and a supervisor without expensive external components; a rapid spanning tree protocol (RSTP) that allows a ring architecture of up to forty controllers; a BACnet building controller (BBC); and standard workstation support for an industry standard interface. The present system may be built on other subsystems but represents a new platform in terms of overall layout, performance and cost.

FIG. 1 is a diagram of a summary view of a controller 11 and associated components. FIGS. 2A, 2B, 2C, 2D and 2E show portions 91, 92, 93, 94 and 95, respectfully of FIG. 1.

Figure 2A:
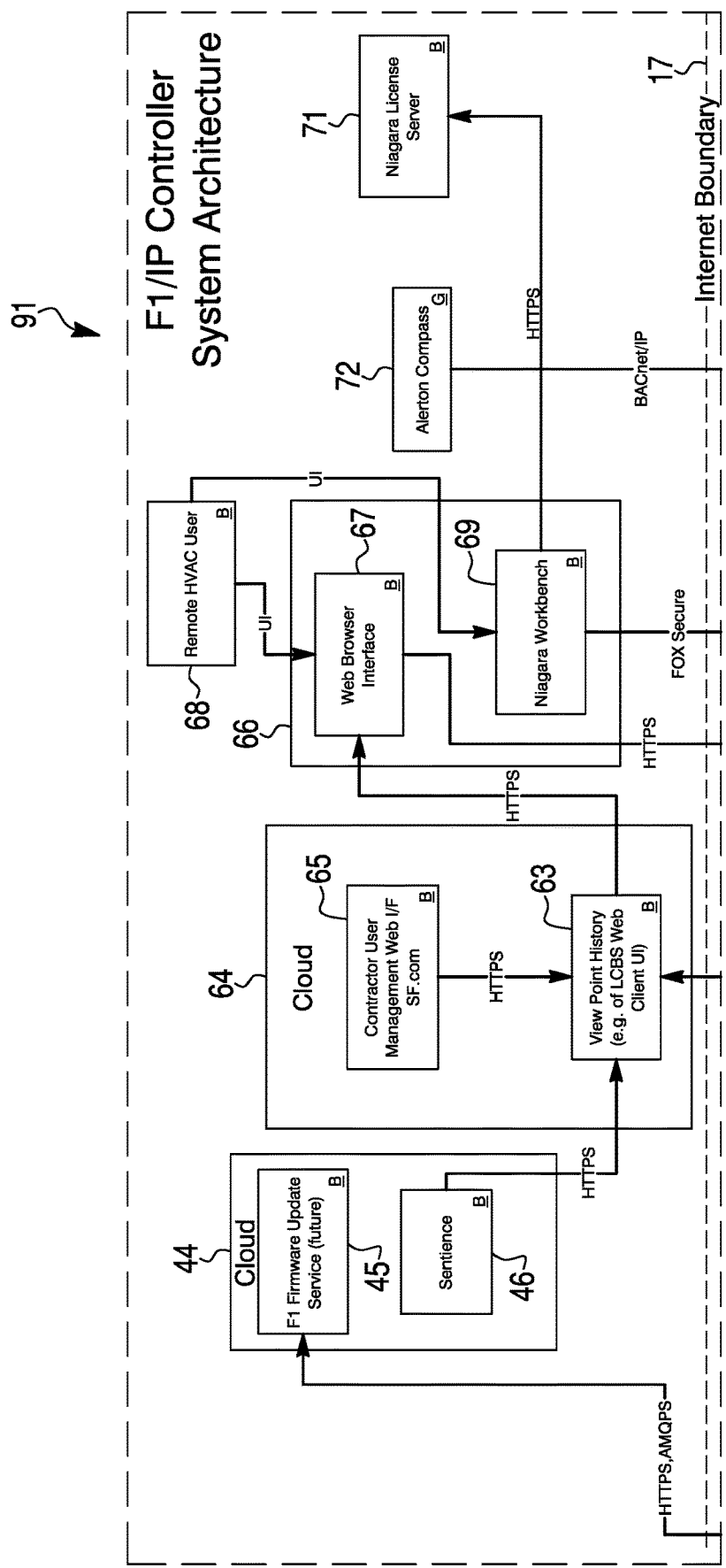
FIGS. 2A, 2B, 2C, 2D and 2E are diagrams of enlarged portions from FIG. 1.
Figure 2B:
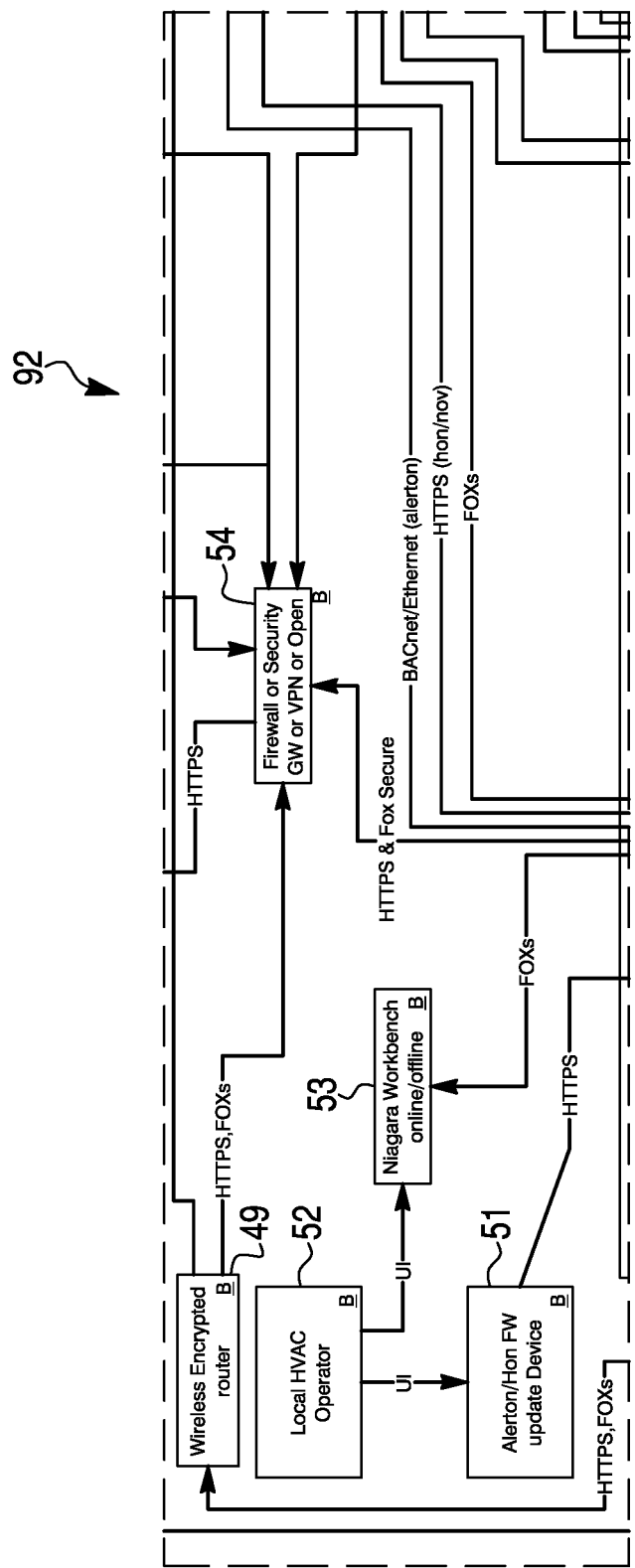
Figure 2C:
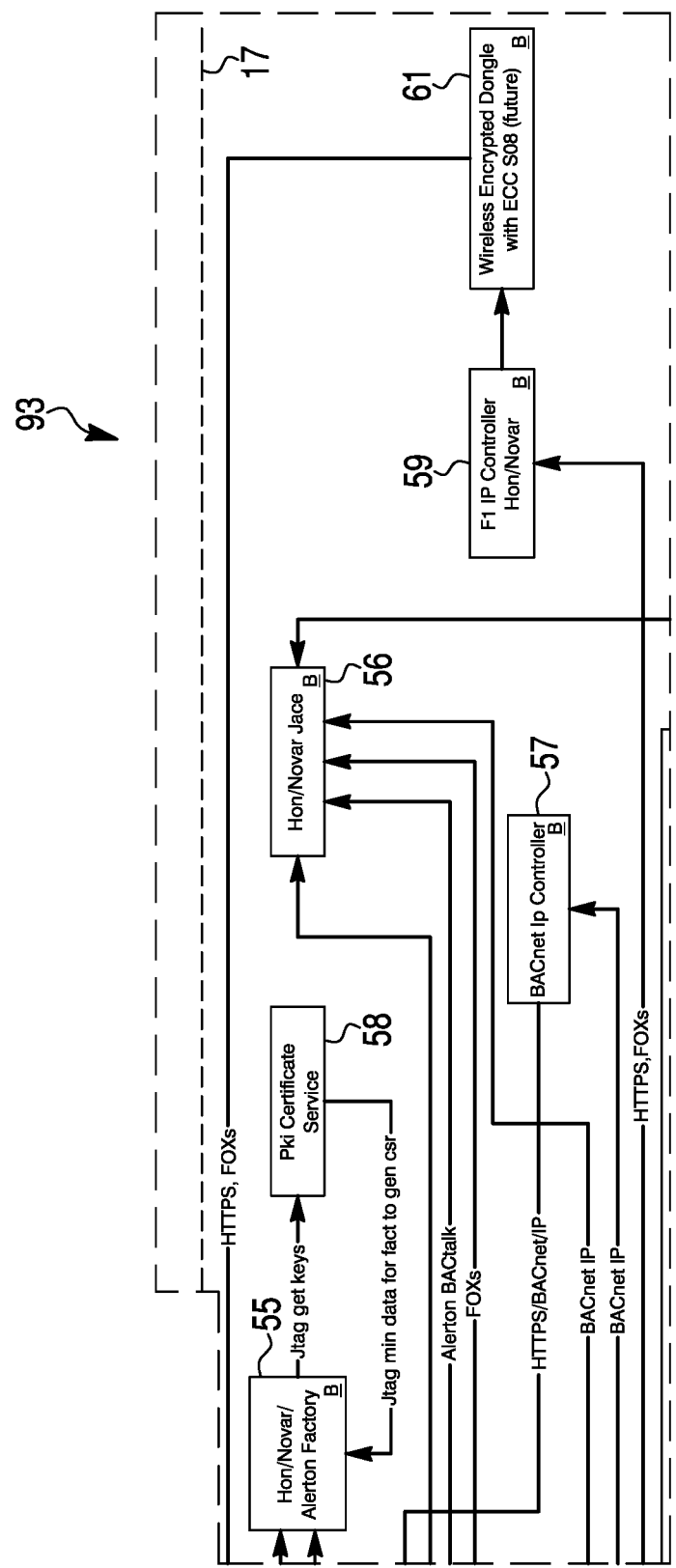
Figure 2D:
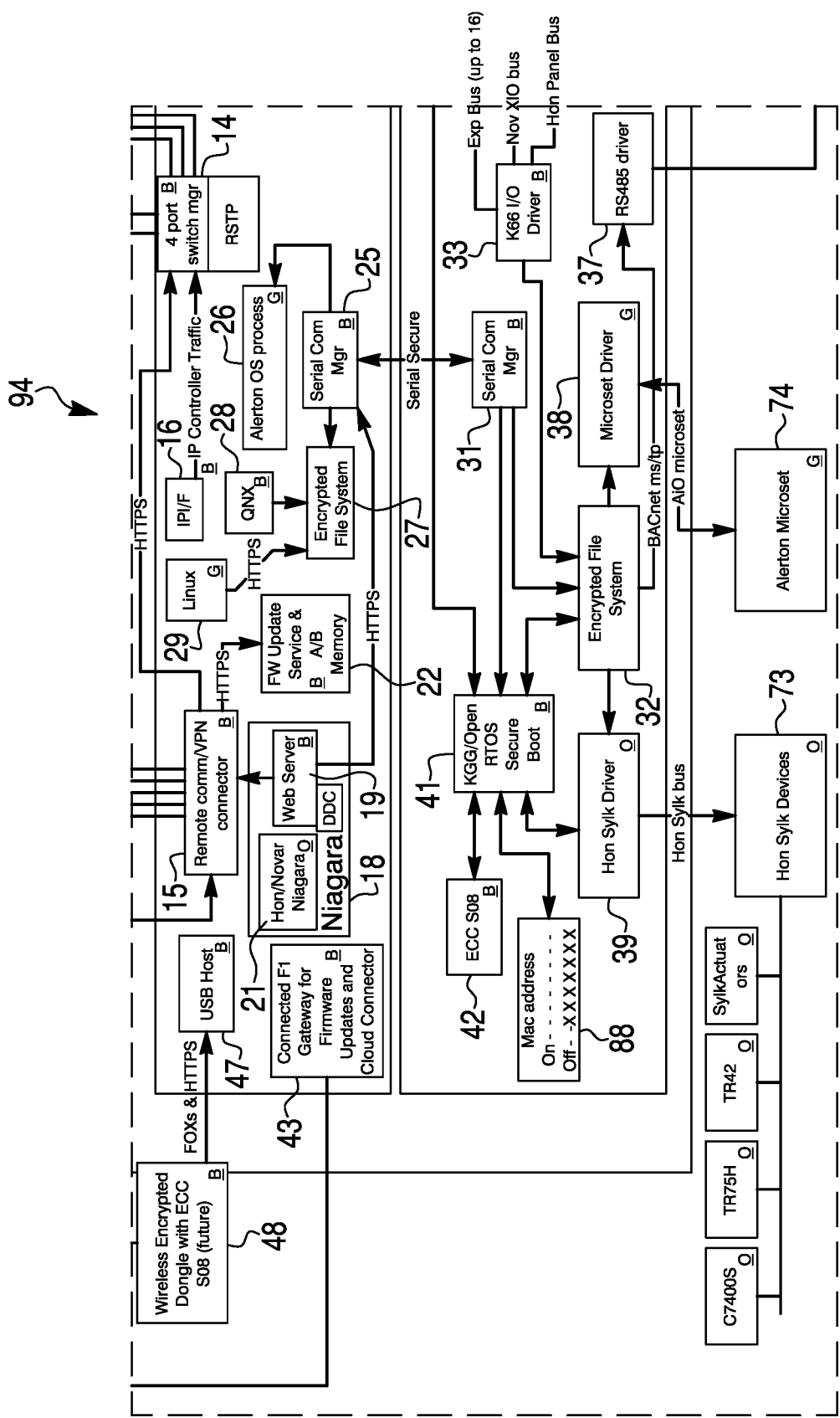
Figure 2E:
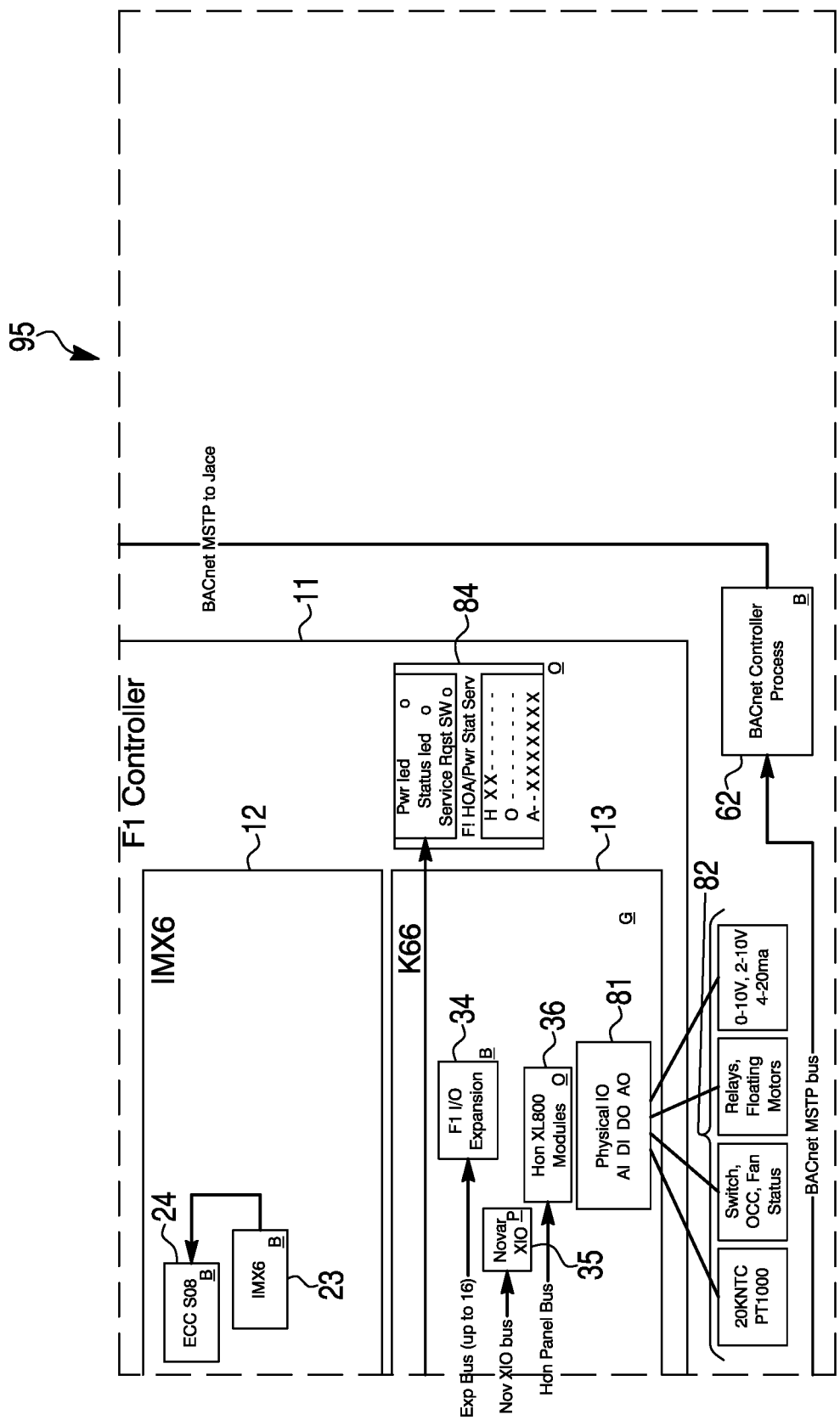

In FIGS. 2D and 2E show portions 94 and 95, respectfully, revealing that controller 11 may have a card or board 12 and a card or board 13. There may be just one board or more than two boards. For illustrative purposes, there may be two boards. Card 12 may have a 4-port switch 14 having a speed of one or more Gbps. Switch 14 may have an HTTPS input from a remote comm/VPN connector 15. Connector 15 may also have an input of IP controller traffic from IP I/F 16. Two other ports of switch may be connected outside of controller 11 and across an internet boundary 17. Remote comm/VPN 15 may have connections outside of controller 11.

A Niagara component 18 on board 12 may have a web server 19 and component 21 connected to remote comm/VPN connector 15. A function block engine may be situated in component 21 and have a direct digital control connection to remote comm/VPN connector 15. An HTTPS connection from remote comm/VPN connector 15 may go to an FW update service & AB memory.

An IMX6 23 may be connected to an ECC 508 24. These components may be substituted with similar components from different makers. A serial communication mgr 25 may be connected to an operating system (OS) processor 26 and to an encrypted file system 27. An ONX 28 and a Linux 29 may be connected to encrypted file system 27.

Serial com mgr 25 of board 12 may have a connection to a serial com mgr 31 of board 13. There is serial security between components 25 and 31 via a high speed (e.g., greater than one Gbps) channel 85 connecting components 25 and 31. Data that are static and moving between components may be encrypted.

Serial com mgr 31 may be connected to an encrypted file system 32. An IO driver 33 may be connected to encrypted file system 32. Driver 33 may provide an expansion bus (up to 16) to controller IO expansion component 34, and signals to X10 bus 35 and panel bus signals to a company's XL800 modules 36. BACnet ms/tp signals may go from encrypted file system 32 to an RS 485 driver 37. Signals may go from encrypted file system 32 to a microset driver 38. Signals may also go from encrypted file system 32 to Sylk™ driver 39. An open RTOS-secure boot 41 may provide signals to encrypted file system 32 and to ECC 508 42. Mac address information from boot 41 may be provided to block 88.

A physical IO 81 may be associated with modules 36 and provide AI, DI, DO and AO terminals, which may connected to a variety of devices 82, for example, "20KNTC PT1000", "Switch, OCC, Fan Status", "Relays, Floating Motors", and "0-10V, 2-10V, 4-20 ma", respectively.

An HOA board 84 may be connected to open RTOS-secure boot 41. One part of board 84 may reveal Power, Status and Service Request SW, with LED's. Another part of board 84 may reveal HOA control, and hand-off-auto (HOA) switches. An H selection may enable an output to the web server, an O selection may disable an output to the web server, and an A selection may provide an automatic signal to the web server. With an A selection, the function block engine may be activated to output a signal or calculation command as directed by the automatic signal.

A connected controller 11 gateway 43 for firmware updates and a cloud connector, may provide HTTFS, AMQPS signals across internet boundary 17 to a controller 11 firmware update service component 45 of a cloud 44.

A USB host 47 may have a FOXs & HTTPS connection to a wireless encrypted dongle 48 with ECC 508. An HTTPS, FOXs connection may go from dongle 48 to a wireless encrypted router 49. A connection may go from a PW update device 51 to remote comm/VPN connector 15. A local HVAC operator station 52 may have a UI connection to FW update device 51 and a UI connection to a Niagara workbench 53 online/offline. A FOXs connection may go from remote comm/VPN connector 15 to Niagara workbench 53.

An HTTPS, FOXs may go from wireless encrypted router 49 to a firewall or security GW or VPN or open mechanism 54 shown in portion 92 of FIG. 2B. An HTTPS & FOX secure connection may go from remote comm/VPN connector 15 to mechanism 54 in portion 92 of FIG. 2B. A BACnet/Ethernet connection may go from remote comm/VPN connector 15 to factory 55. An HTTPS connection may go from remote comm/VPN connector 15 to factory 55.

Power over Ethernet (PoE) is a technology for wired Ethernet local area networks (LANs) that may allow the electrical current necessary for the operation of each device to be carried by the data cables rather than by power cords. This technology may be useful in expansion or chain connections of components such as subsystems, systems, controllers, and so forth.

A FOXs connection may go from remote comm/VPN connector 15 to a JACE 56 as shown in portion 93 of FIG. 2C. A BACnet connection may go from four-port switch mgr 14 to JACE 56. A FOXs connection may go from switch 14 to JACE 56. A BACnet IP connection may go from switch 14 to JACE 56. A BACnet IP connection may go from switch 14 to a BACnet to controller device 57. An HTTPS/BACnet/IP connection may go from device 57 to mechanism 54. A "jtag get Keys" connection may go from factory 55 to a Pki certificate service module 58. A "jtag min data for fact to gen csr" connection may go from Pki service module 58 to factory 55. An HTTPS FOXs connection may go from switch 14 to controller 11 box 59. A connection may go from box 59 to a wireless encrypted dongle 61, with ECC 508. An HTTPS, FOXs connection may go from wireless encrypted router 49 to wireless encrypted dongle 61.

A BACnet MSTP bus connection may go from driver 37 to a BACnet controller process module 62 in portion 95 of FIG. 2E. A BACnet MSTP to JACE connection may go from module 62 to JACE 56.

A connection HTTPS may go from a sentinence 46 of cloud 44 to a view point history module 63 (e.g., of LCBS web client UI) in portion 91 of FIG. 2A. An HTTPS connection may go from a contractor user management web I/F SF.COM module 65 of a cloud 64 to module 63. An HTTPS connection may go from mechanism 54 to module 63. An HTTPS connection may go from module 63 to a web browser interface 67 of a module 66. A remote HVAC user device 68 may have a UI connection to web browser 67 and a UI connection to a Niagara workbench 69 of module 66. An HTTPS connection may go from web browser interface 67 to mechanism 54. An HTTPS connection may go from Niagara workbench 69 to a Niagara license server 71. A FOX Secure connection may go from workbench 69 to mechanism 54. A compass 72 may have a BACnet/IP connection to mechanism 54.

Sylk driver 39 may have a Sylk bus connection to Sylk devices 73, such as, for example, modules C7400S, TR75H, TR42, and actuators. Microset driver 38 may have an AIO microset connection to a microset 74 set of devices.

To recap, a system controller may incorporate an event-driven software framework, a direct digital control module integrated on the event-driven software framework, a web-server connected to the direct digital control, a remote communication connector connected to the web server and the software framework, a multi-port switch having a port connected to the remote communication connector, a first secure serial communication module connected to the software framework, a first encryption file system connected to the secure serial communication module, and an input/output (IO) subsystem connected to the secure serial communication module.

The multi-port switch may have a speed of at least one Gbps.

The IO subsystem may incorporate a second secure serial communication module connected to the first secure serial communication module, and a second encrypted file system connected to the second secure serial communication module.

The IO subsystem may further incorporate a Sylk driver connected to the second encrypted file system. Sylk may be a two wire polarity insensitive communication connection for one or more Sylk devices.

The IO subsystem may further incorporate a microset driver or an RS485 driver connected to the encrypted file system and a BACnet controller process module.

The BACnet controller process module may be connected to a JACE.

The system may further incorporate a gateway for firmware updates.

The system may further incorporate a gateway for a cloud connection.

The system may further incorporate an HOA board, and an HOA driver connected to the HOA board. The HOA driver may be connected to the second encrypted file system.

The secure serial communication module may be a high speed device that conveys at a rate of at least 1 Gbps.

The event-driven software framework may be a Niagara device.

The system may further incorporate a rapid spanning tree protocol (RSTP) module connected to a port of the multi-port switch.

The RSTP module permits a ring architecture of up to at least forty controllers.

A controller system may incorporate an event-driven software framework, a live view wire sheet connected to the software framework, a function block engine situated in the software framework, and wherein when a function block is dragged on a screen in the software framework and once the function block is dropped on the screen, the function block is instantly, near real-time or pseudo deterministic alive, wherein near real-time or pseudo deterministic means that a delay relative to instantly is greater than zero and less than ten milliseconds, a web server in the software framework connected to a first serial communication component, a communication channel that connects to the first serial communication component to a second serial communication component; and an IO subsystem connected to the second serial communication component.

The system may further incorporate one or more hand-off-auto (HOA) switches connected to the second serial communication component, the communication channel, the first serial communication channel and the web server.

An H selection may enable an output to the web server, an O selection may disable an output to the web server, and an A selection may provide an automatic signal to the web server. With an A selection, the function block engine may be activated to output a signal or calculation command as directed by the automatic signal.

The system may further incorporate a multi-port switch having a speed of at least one Gbps, and a remote communication connector connected to the software framework and one or more components in the software framework, and connected to the multi-port switch. The multi-port switch may be connected to a JACE, a BACnet internet protocol controller, and a cloud.

An approach for controlling signals, may incorporate implementing a web server, and a direct digital control component or function block engine with a software structure, and installing a secure communications network between the software structure and an IO system. The IO system may incorporate one or more items selected from a group containing a microset driver, a physical IO subsystem, an RS485 driver, a two-wire polarity insensitive driver, a status indicator and an HOA switch panel.

The secure communication network has a speed of at least one Gbps.

The approach may further incorporate connecting a multi-port switch to one or more items selected from a group comprising the web server, the direct digital control component or function block engine, a remote communications connector, a JACE, an RSTP, and a BACnet IP controller.

U.S. Pat. No. 10,200,203, issued Feb. 5, 2019; U.S. Pat. No. 8,375,402, issued Feb. 12, 2013; U.S. Pat. No. 9,726, 392, issued Aug. 8, 2017; U.S. Pat. No. 8,983,632, issued Mar. 17, 2015; U.S. Pat. No. 8,954,543, issued Feb. 10, 2015; U.S. Pat. No. 8,650,306, issued Feb. 11, 2014; U.S. Pat. No. 8,418,128, issued Apr. 9, 2013; U.S. Pat. No. 8,239,500, issued Aug. 7, 2012; U.S. Pat. No. 8,112,162, issued Feb. 7, 2012; U.S. Pat. No. 7,826,929, issued Nov. 2, 2010; U.S. Pat. No. 7,738,972, issued Jun. 15, 2010; and U.S. Pat. No. 7,653,459, issued Jan. 26, 2010; are all hereby incorporated by reference.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A controller system comprising:
an event-driven software framework stored in a memory;
a live view wire sheet connected to the software framework;
a function block engine situated in the software framework, and wherein when a function block is dragged on a screen in the software framework and once the function block is dropped on the screen, the function block is instantly, near real-time or pseudo deterministic alive, wherein near real-time or pseudo deterministic means that a delay relative to instantly is greater than zero and less than ten milliseconds;
a web server in the software framework and including a hardware processor connected to a first serial communication component;
a communication channel that connects to the first serial communication component to a second serial communication component;
a physical IO subsystem connected to the second serial communication component; and
one or more hand-off-auto (HOA) switches connected to the second serial communication component, the communication channel, the first serial communication channel and the web server.

2. The system of claim 1, wherein:
an H selection enables an output to the web server, an O selection disables an output to the web server, and an A selection provides an automatic signal to the web server; and
with an A selection, the function block engine is activated to output a signal or calculation command as directed by the automatic signal.

3. The system of claim 1, further comprising:
a multi-port switch having a speed of at least one Gbps; and
a remote communication connector connected to the software framework and one or more components in the software framework, and connected to the multi-port switch; and
wherein the multi-port switch is connected to a JACE, a BACnet internet protocol controller, and a cloud.

4. The system of claim 1, further comprising a multi-port switch having a speed of at least one Gpbs.

5. The system of claim 1, further comprising a remote communication connector connected to the software framework and one or more components in the software framework.

6. The system of claim 1, further comprising a first secure serial communication module connected to the software framework.

7. The system of claim 6, further comprising a first encryption file system connected to the first secure serial communication module.

8. The system of claim 7, wherein the physical IO subsystem comprises:

a second secure serial communication module connected to the first secure serial communication module; and a second encrypted file system connected to the second secure serial communication module.

9. The system of claim 8, wherein the physical TO subsystem further comprises:

a Sylk driver connected to the second encrypted file system; and wherein Sylk is a two wire polarity insensitive communication connection for one or more Sylk devices.

10. The system of claim 8, wherein the physical TO subsystem further comprises a microset driver or an RS485 driver connected to the encrypted file system and a BACnet controller process module.

11. A controller system comprising:

an event-driven software framework stored in a memory;

a live view wire sheet connected to the software framework;

a function block engine situated in the software framework, and wherein when a function block is dragged on a screen in the software framework and once the function block is dropped on the screen, the function block is instantly, near real-time or pseudo deterministic alive, wherein near real-time or pseudo deterministic means that a delay relative to instantly is greater than zero and less than ten milliseconds;

a web server in the software framework and including a hardware processor connected to a first serial communication component;

a communication channel that connects to the first serial communication component to a second serial communication component;

a physical IO subsystem connected to the second serial communication component;

a multi-port switch having a speed of at least one Gbps; and a remote communication connector connected to the software framework and one or more components in the software framework, and connected to the multi-port switch; and wherein the multi-port switch is connected to a JACE, a BACnet internet protocol controller, and a cloud.

12. The system of claim 11 further comprising one or more hand-off-auto (HOA) switches connected to the second serial communication component, the communication channel, the first serial communication channel and the web server; and wherein:

an H selection enables an output to the web server, an O selection disables an output to the web server, and an A selection provides an automatic signal to the web server; and with an A selection, the function block engine is activated to output a signal or calculation command as directed by the automatic signal.

13. The system of claim 11, further comprising a first secure serial communication module connected to the software framework.

14. The system of claim 13, further comprising a first encryption file system connected to the first secure serial communication module.

15. The system of claim 14, wherein the physical IO subsystem comprises:

a second secure serial communication module connected to the first secure serial communication module; and a second encrypted file system connected to the second secure serial communication module.

16. The system of claim 14, wherein the physical IO subsystem further comprises:

a Sylk driver connected to the second encrypted file system; and wherein Sylk is a two wire polarity insensitive communication connection for one or more Sylk devices.

17. The system of claim 14, wherein the physical IO subsystem further comprises a microset driver or an RS485 driver connected to the encrypted file system and a BACnet controller process module.

* * * * *